US010027079B2

(12) United States Patent
Lu et al.

(10) Patent No.: US 10,027,079 B2
(45) Date of Patent: Jul. 17, 2018

(54) CONNECTOR APPLIED TO USF CARD AND MICRO SD CARD

(71) Applicant: Amphenol Shouh Min Industry (Shen Zhen) Co., Ltd., Shenzhen (CN)

(72) Inventors: Weiwei Lu, Shenzhen (CN); Zhimin Qin, Shenzhen (CN); Zefeng Lai, Shenzhen (CN)

(73) Assignee: Amphenol Shouh Min Industry (Shen Zhen) Co., Ltd., Shenzhen (CN)

( * ) Notice: Subject to any disclaimer, the term of this patent is extended or adjusted under 35 U.S.C. 154(b) by 0 days.

(21) Appl. No.: 15/336,147

(22) Filed: Oct. 27, 2016

(65) Prior Publication Data

US 2018/0123302 A1  May 3, 2018

(51) Int. Cl.
  *H01R 27/00* (2006.01)
  *H01R 12/72* (2011.01)

(52) U.S. Cl.
  CPC .......... *H01R 27/00* (2013.01); *H01R 12/721* (2013.01)

(58) Field of Classification Search
  CPC .............................. H01R 12/721; H01R 27/00
  See application file for complete search history.

(56) References Cited

U.S. PATENT DOCUMENTS

| 7,044,389 | B2* | 5/2006 | Nishizawa | G06K 19/0719 235/441 |
| 7,628,624 | B2* | 12/2009 | Ye | H01R 27/00 439/137 |
| 2012/0315781 | A1* | 12/2012 | Little | G06K 13/0825 439/345 |
| 2015/0363121 | A1* | 12/2015 | Jung | G06F 13/4068 711/154 |
| 2017/0053199 | A1* | 2/2017 | Kwon | G06K 19/07741 |

* cited by examiner

*Primary Examiner* — James Harvey
*Assistant Examiner* — Oscar Jimenez
(74) *Attorney, Agent, or Firm* — Howard IP Law Office, PA

(57) ABSTRACT

The present application relates to the field of electric vehicle connector, particularly to a new connector applied to USF cards and Micro SD cards. The connector comprises an end component, a frame and an outer shell. The end component is provided in the frame covered with the outer shell; UFS cards or Micro SD cards can be inserted into the frame and connected with the end component; the end component includes nineteen ends, i.e., Pin 1 to Pin 19; the ends of the inserted UFS card or Micro SD card can be connected with respective ends of the end component; the UFS card includes twelve ends(i.e., u1 to u12); the Micro SD card includes eight ends(i.e., m1 to m8). The beneficial effects of the present application are that: on the basis of existing UFS card connector, the ends 1-10, 11, 12 and 19 form a complete data transmission structure for the UFS card; at the same time, the ends 11-19 form a complete data transmission structure applied to the Micro SD card, so that the connector is applied to UFS cards and Micro SD cards.

9 Claims, 4 Drawing Sheets u1 ———— Pin 1
u2 ———— Pin 2
u3 ———— Pin 3
u4 ———— Pin 4
u5 ———— Pin 5
u6 ———— Pin 6
u7 ———— Pin 7
u8 ———— Pin 8
u9 ———— Pin 9
u10 ———— Pin 10
u11 ——┬—— Pin 11
      └—— Pin 19
u12 ———— Pin 12

FIGURE 4 m1 ———— Pin 18
m2 ———— Pin 17
m3 ———— Pin 16
m4 ———— Pin 12
m5 ———— Pin 15
m6 ——┬—— Pin 11
     └—— Pin 19
m7 ———— Pin 13
m8 ———— Pin 14

FIGURE 5

CONNECTOR APPLIED TO USF CARD AND MICRO SD CARD

TECHNICAL FIELD

The present application relates to the field of connector, particularly to a new connector applied to USF cards and Micro SD cards.

BACKGROUND

USF is a storage standard drafted by many semiconductor corporations of the industry to replace eMMC and SD cards, every channel of the transmission interface of which has a transmission rate ranging from 2.9 to 5.8 Gbps. Even UFS 1.0 provides a bandwidth of 600 MB/s for every channel in each direction, needless to say UFS 2.0 doubles that to 1.2 GB/s.

The contour of a UFS card is irregular with one wave shaped side and has a length of 15 mm at most, a width of 11 mm at most and a thickness of 1.0 mm at most.

Nowadays more and more cell phones are provided with UFS high speed flash memory cards. Compared with currently popular Micro SD cards, UFS cards are faster to transmit. Therefore, the use of Micro SD cards has been eliminated from a new generation of cell phone products of many dominant brands.

However. Micro SD cards are still widely used, as a result of which people has been seeking a coexistence way of UFS cards and Micro SD cards.

SUMMARY OF THE APPLICATION

To solve above described technical problems, the present application provides a new connector of high speed and density applied to USF cards and Micro SD cards.

To achieve above described objective, the technical solutions to the application are detailed as follows:
a new connector applied to USF cards and Micro SD cards comprises an end component, a frame and an outer shell, wherein the end component is provided in the frame covered with the outer shell;
a UFS card or Micro SD card can be inserted into the frame and connected with the end component;
the end component includes nineteen ends, i.e., Pin 1 to Pin 19.
   The ends of the inserted UFS card or Micro SD card can be connected with respective ends of the end component, details are shown in FIGS. 4 and 5.
FIG. 4 gives end correspondence between the UFS card and the present connector.
The UFS card includes twelve ends, i.e., u1 to u12.
   The end 'Pin 19' is used as a switch and is "normally open" when there isn't any card inserted within it; the Pin 19 is converted to "closed" and is connected with the end u11 of the UFS card when a UFS card is inserted into the present connector; and the 'Pin 19' will be returned to its "normally open" state when the UFS card is pulled out of the connector.
FIG. 5 gives end correspondence between the Micro SD card and the present connector.
The Micro SD card includes eight ends, i.e., m1 to m8.
   The end 'Pin 19' is used as a switch and is "normally open" when there isn't any card inserted within it; the 'Pin 19' is converted to "closed" and is connected with the end m6 of the Micro SD card when a Micro SD card is inserted into the present connector; and the 'Pin 19' will be returned to its "normally open" state when the Micro SD card is pulled out of the connector.

Respective functions of the u1 to u12 of the UFS card are detailed in table 1:

| PIN NO. | FUNCTION |
| --- | --- |
| Pin 1 | VSS |
| Pin 2 | DIN_C |
| Pin 3 | DIN_T |
| Pin 4 | VSS |
| Pin 5 | DOUT_C |
| Pin 6 | DOUT_T |
| Pin 7 | VSS |
| Pin 8 | REF_CLK |
| Pin 9 | VCCQ2 |
| Pin 10 | C/D(GND) |
| Pin 11 | VSS |
| Pin 12 | VCC |

Respective functions of the m1 to m8 of the Micro SD card are detailed in table 2:

| PIN NO | FUNCTION |
| --- | --- |
| 1 | DATA LINE (BIT 2) |
| 2 | CARD DETECT/DATA LINE (BIT 3) |
| 3 | COMMAND RESPONSE |
| 4 | SUPPLY VOLTAGE |
| 5 | CLOCK |
| 6 | SUPPLY VOLTAGE GROUND |
| 7 | DATA LINE (BIT 0) |
| 8 | DATA LINE (BIT 1) |

In a further preferred technical solution, the first to tenth ends(i.e., Pin 1 to Pin 10) of the end component are of straight bar constructions, and the eleventh to nineteenth ends(Pin 11 to Pin 19) of the components are of paper clip-shaped constructions.

In a further preferred technical solution, the nineteen ends of the end component are provided in the frame in two rows, wherein the first to tenth ends(Pin 1 to Pin 10) are arranged in one row and the eleventh to nineteenth ends(Pin 11 to Pin 19) are arranged in another row.

Compared with the prior art, the beneficial effects of the present application are that: the new connector is applied to UFS cards and Micro SD cards by optimizing the structure and arrangement of the ends. Specifically, on the basis of existing UFS card connectors, the ends 1-10, 11, 12 and 19 form a complete data transmission structure for the UFS card; at the same time, the ends 11-19 form a complete data transmission structure applied to the Micro SD card, so that the connector is applied to UFS cards and Micro SD cards.

The Pin 19 is used as a switch suitable for hot plugging, to eliminate overheat and to protect memory storage of the UFS card or Micro SD card to prevent the stored data from missing.

BRIEF DESCRIPTION OF THE DRAWINGS

FIG. 4 gives end correspondence betwenn the UFS card and the present comnnector; and FIG. 5 gives end correspondence between the Micro SD card and the present connector.

DETAILED DESCRIPTION

The present application will be detailed in connection with FIGS. 1 to 5 and the specific embodiments, which are in no way intended to limit the present application.

Figure 1:
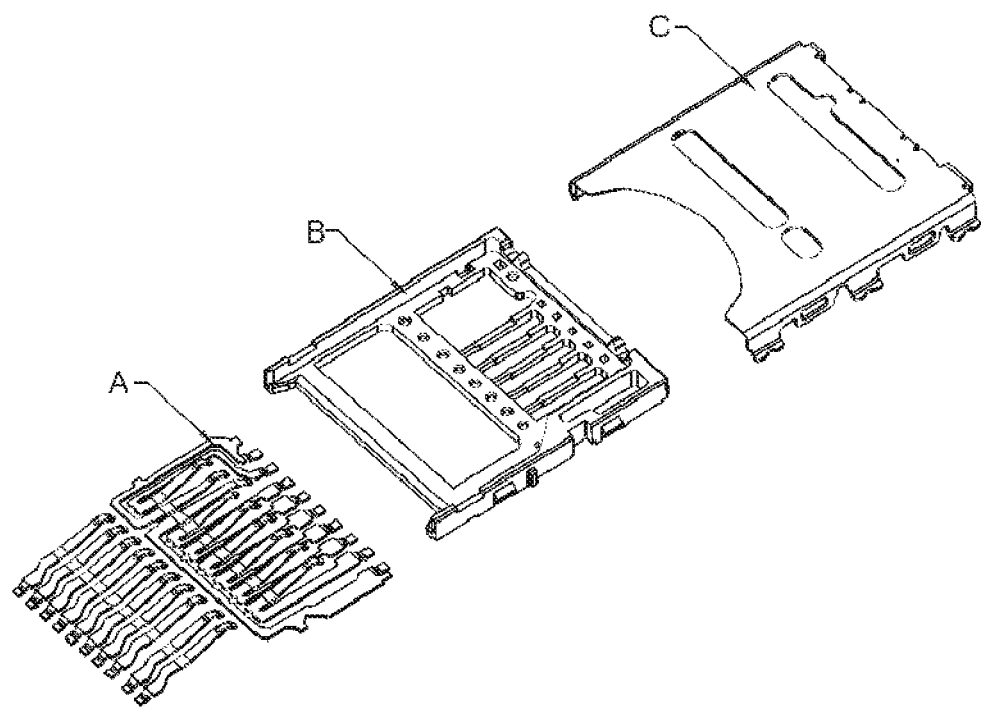
FIG. 1 is an exploded view of a new connector applied to UFS cards and Micro SD cards.

As shown in FIG. 1, a new connector applied to UFS cards and Micro SD cards comprises an end component A, a frame B and an outer shell C, the end component A is provided in the frame B covered with the outer shell C.

Figure 2:
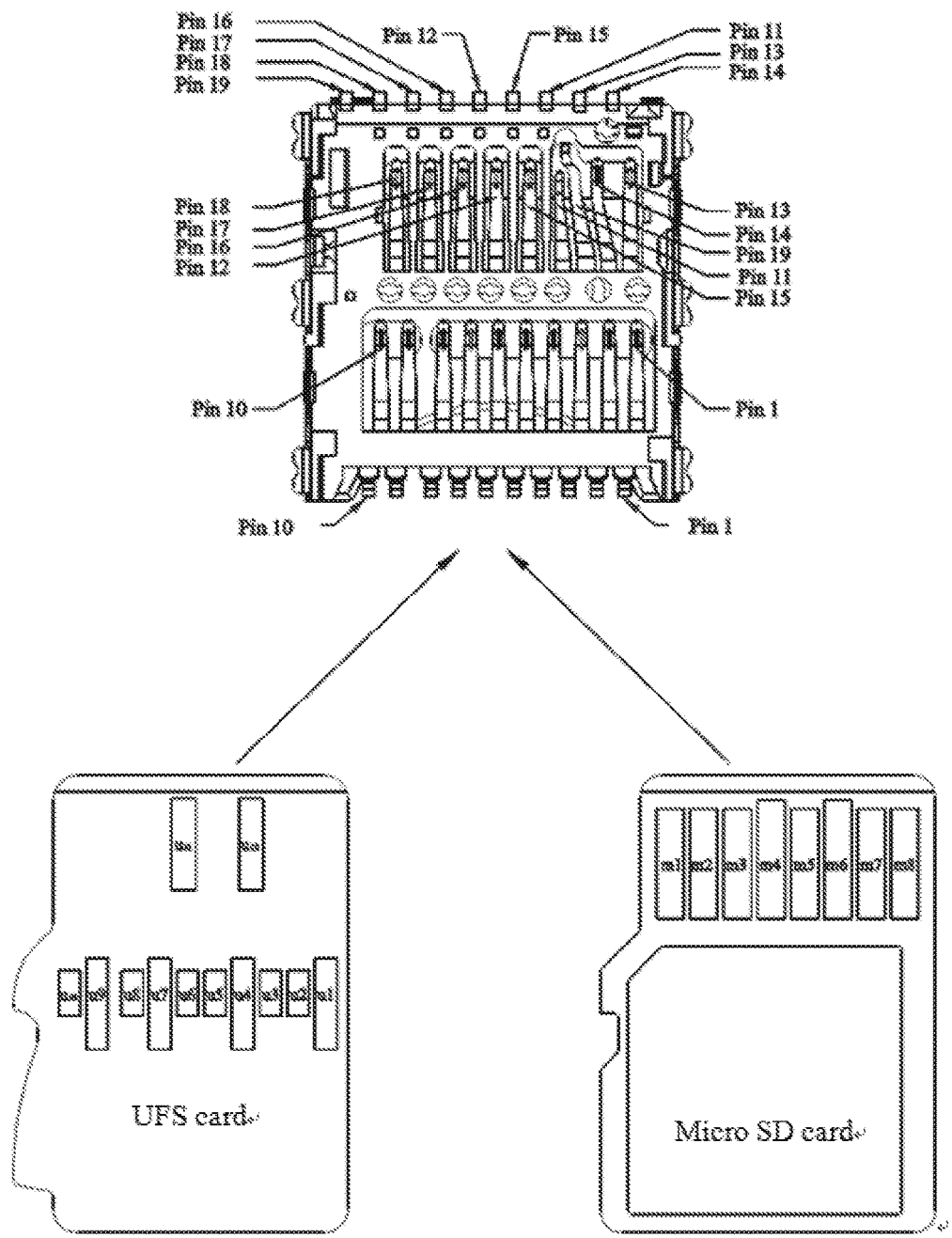
FIG. 2 is a schematic diagram of respective connections between a UFS card or a Micro SD card and the ends of the present connector.

As shown in FIG. 2, a UFS card or Micro SD card can be inserted into the frame B and connected with the end component A.

Figure 3:
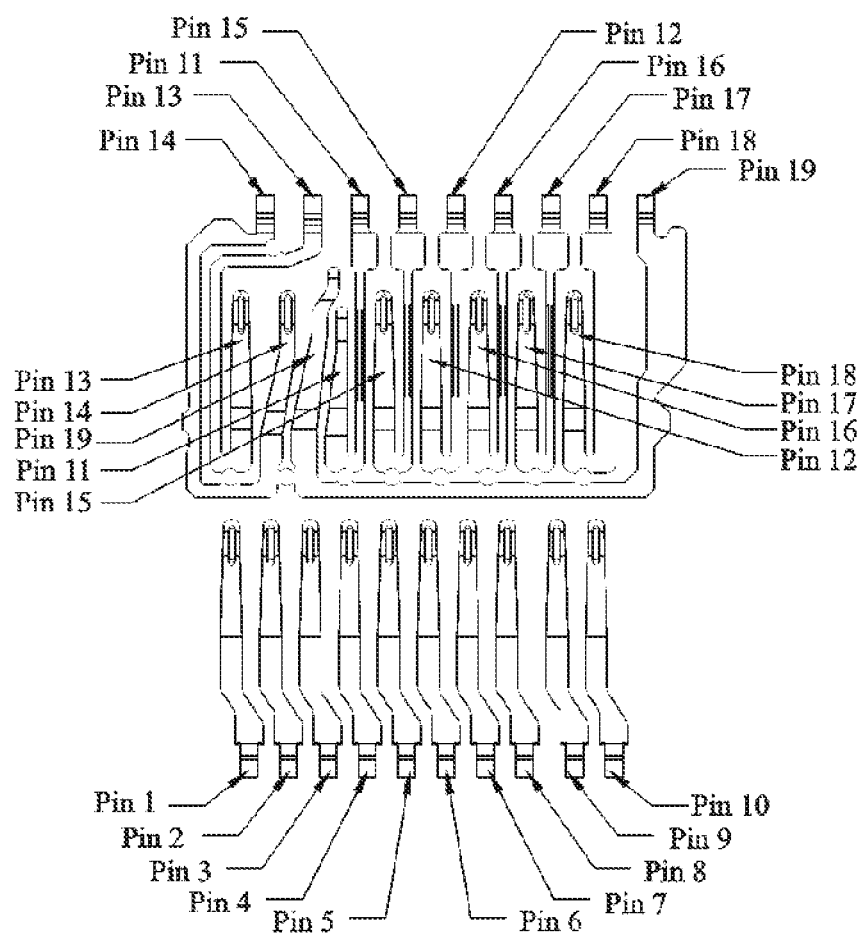
FIG. 3 is a profile of the ends of the new connector applied to UFS card and Micro SD card.

As shown in FIG. 3, the end component A includes nineteen ends, i.e., Pin 1 to Pin 19.

The ends of the inserted UFS card or Micro SD card can be connected with respective ends of the end component A, details are shown in FIGS. 4 and 5.

FIG. 4 gives end correspondence between the UFS card and the present connector.

The UFS card includes twelve ends, i.e., u1 to u12.

The end 'Pin 19' is used as a switch and is "normally open" when there isn't any card inserted within it; the 'Pin 19' is converted to "closed" and is connected with the end u11 of the UFS card when a UFS card is inserted into the present connector; and the 'Pin 19' will be returned to its "normally open" state when the UFS card is pulled out of the connector.

FIG. 5 gives end correspondence between the Micro SD card and the present connector.

The Micro SD card includes eight ends, i.e., m1 to m8.

The end 'Pin 19' is used as a switch and is "normally open" when there isn't any card inserted within it; the 'Pin 19' is converted to "closed" and is connected with the end m6 of the Micro SD card when a Micro SD card is inserted into the present connector; and the 'Pin 19' will be returned to its "normally open" state when the Micro SD card is pulled out of the connector.

Respective functions of the twelve ends(i.e., u1 to u12) of the UFS card are detailed in table 1:

| PIN NO. | FUNCTION |
| --- | --- |
| Pin 1 | VSS |
| Pin 2 | DIN_C |
| Pin 3 | DIN_T |
| Pin 4 | VSS |
| Pin 5 | DOUT_C |
| Pin 6 | DOUT_T |
| Pin 7 | VSS |
| Pin 8 | REF_CLK |
| Pin 9 | VCCQ2 |
| Pin 10 | C/D (GND) |
| Pin 11 | VSS |
| Pin 12 | VCC |

Respective functions of the eight ends(i.e., m1 to m8) of the Micro SD card are detailed in table 2:

| PIN NO | FUNCTION |
| --- | --- |
| 1 | DATA LINE (BIT 2) |
| 2 | CARD DETECT/DATA LINE (BIT 3) |

-continued

| PIN NO | FUNCTION |
| --- | --- |
| 3 | COMMAND RESPONSE |
| 4 | SUPPLY VOLTAGE |
| 5 | CLOCK |
| 6 | SUPPLY VOLTAGE GROUND |
| 7 | DATA LINE (BIT 0) |
| 8 | DATA LINE (BIT 1) |

As shown in FIG. 3, the first to tenth ends(i.e., Pin 1 to Pin 10) of the end component A are of straight bar constructions, and the eleventh to nineteenth ends(i.e., Pin 11 to Pin 19) of the end component A are of paper clip-shaped constructions.

As shown in FIG. 3, the nineteen ends of the end component A are provided in the frame B in two rows, wherein the first to tenth ends (i.e., Pin 1 to Pin 10) are arranged in one row and the eleventh to nineteenth ends are arranged in another row.

In light of general technical knowledge, present technical solutions can be achieved by other embodiments which are not departed from spiritual substance or essential features of the application. Therefore, above described embodiments are simply illustrative in any way and are not intended to limit the application. All the changes within the range of the application or its equivalent are included in the application itself.

The invention claimed is:

1. An electrical connector for receiving at least UFS cards and Micro SD cards comprising:
   an end component including nineteen contact ends (Pin 1-Pin 19);
   a frame; and
   an outer shell arranged such that the end component is at least partially disposed in the frame and the frame is at least partially disposed within the outer shell,
   wherein a UFS card or a Micro SD card can be inserted into the frame and connected with the end component,
   wherein the contact ends are configured such that, when a UFS card is inserted into the frame, Pin 1 corresponds to UFS card pin u1, Pin 2 corresponds to UFS card pin u2, Pin 3 corresponds to UFS card pin u3, Pin 4 corresponds to UFS card pin u4, Pin 5 corresponds to UFS card pin u5, Pin 6 corresponds to UFS card pin u6, Pin 7 corresponds to UFS card pin u7, Pin 8 corresponds to UFS card pin u8, Pin 9 corresponds to UFS card pin u9, Pin 10 corresponds to UFS card pin u10, Pin 11 corresponds to UFS card pin u11, Pin 12 corresponds UFS card pin u12, and Pin 19 is in a closed position so that Pin 19 electrically connects with Pin 11 and UFS card pin u11,
   wherein the contact ends are configured such that, when a Micro SD card is inserted into the frame, Pin 18 corresponds to Micro SD card pin m1, Pin 17 corresponds to Micro SD card pin m2, Pin 16 corresponds to Micro SD card pin m3, Pin 12 corresponds to Micro SD card pin m4, Pin 15 corresponds to Micro SD card pin m5, Pin 11 corresponds to Micro SD card pin m6, Pin 14 corresponds to Micro SD card pin m8, Pin 13 corresponds to Micro SD card pin m7, and Pin 19 is in a closed position so that Pin 19 electrically connects with Pin 11 and Micro SD card pin m6, and
   wherein, Pin 19 is in an open position when a UFS card or Micro SD card is absent from the frame, such that Pin 19 is electrically disconnected from Pin 11.

2. The electrical connector according to claim 1, wherein the first to tenth contact ends (Pin 1-Pin 10) of the end component are of straight bar constructions, and the eleven to nineteenth contact ends (Pin 11-Pin 19) of the end component are of paper clip-shaped constructions.

3. The electrical connector according to claim 1, wherein the nineteen contact ends of the end component are provided in the frame in two rows, wherein the first to tenth contact ends (Pin 1-Pin 10) are arranged in one row and the eleven to nineteenth contact ends (Pin 11-Pin 19) are arranged in another row.

4. The electrical connector according to claim 3, wherein first ends of Pin 1-Pin 19 are configured to contact a UFS card or Micro SD card and second ends of Pin 1-Pin 19 are disposed on the opposite end of the respective pin.

5. The electrical connector according to claim 4, wherein the second ends of Pin 1-Pin 10 are disposed so as to extend from the frame in a first direction and the second ends of Pin11-Pin 19 are disposed to extend from the frame in a second direction.

6. The electrical connector according to claim 4, wherein the second ends of Pin 1-Pin 10 extend from the frame in a first direction and the second ends of Pin11-Pin 19 are disposed to extend from the frame in a second direction which is opposite the first direction.

7. The electrical connector according to claim 4, wherein the second ends of Pin 1-Pin 10 are disposed on a first end of the frame and the second ends of Pin11-Pin 19 are disposed on a second end of the frame, opposite the first end.

8. The electrical connector according to claim 1, wherein Pin 19 is configured such that when Pin 19 is in a closed position, Pin 19 contacts Pin 11.

9. The electrical connector according to claim 1, wherein Pin 19 extends toward Pin 11.

* * * * *